United States Patent [19]

Herrmeyer

[11] Patent Number: 5,273,337
[45] Date of Patent: Dec. 28, 1993

[54] ARTICLE RACK

[75] Inventor: Dennis C. Herrmeyer, Cedar Falls, Iowa

[73] Assignee: Rigid Form, Inc., Paola, Kans.

[21] Appl. No.: 11,895

[22] Filed: Feb. 1, 1993

[51] Int. Cl.$^5$ .............................................. B62D 33/04
[52] U.S. Cl. ..................... 296/181; 296/24.1; 296/3
[58] Field of Search .................. 296/3, 24.1, 181, 183

[56] References Cited

U.S. PATENT DOCUMENTS

| | | | |
|---|---|---|---|
| 1,438,813 | 12/1922 | Day | 296/3 |
| 2,061,673 | 11/1936 | Robinson | 296/181 |
| 2,371,055 | 3/1945 | Le Tourneau | 296/181 |
| 2,478,448 | 8/1949 | Ashford | 296/24.1 |
| 2,710,221 | 6/1955 | Hinners | 296/181 |
| 2,724,611 | 11/1955 | Robertson | 296/3 |
| 2,839,328 | 6/1958 | Prickett et al. | 296/181 |
| 3,415,567 | 12/1969 | McChesney | 296/3 |
| 3,589,768 | 6/1971 | Wilson | 296/24.1 |
| 3,667,635 | 6/1972 | Hackney | 296/3 |
| 3,929,371 | 12/1975 | Gibson | 296/24.1 |

Primary Examiner—Robert R. Song
Attorney, Agent, or Firm—Litman, McMahon & Brown

[57] ABSTRACT

An article rack includes a frame structure with a top, a bottom, a front, a back, a first side and a second side. The frame structure first side includes an opening. The frame structure further includes a plurality of rail subassemblies each including a transverse rail member with a first, lower end located in proximity to the frame structure first side opening and an upper, second end located in proximity to the frame structure second side. The rail member slopes upwardly from its first end to its second end. Respective pairs of rail assemblies are associated with article receiving spaces which are accessible through the opening in the frame structure first side. An enclosure system opening can be selectively closed by a cover or door assembly. The article rack can be mounted on a truck or trailer chassis.

13 Claims, 2 Drawing Sheets

ARTICLE RACK

BACKGROUND OF THE INVENTION

1. Field of the Invention

The present invention relates generally to racks for articles, and in particular to such a rack which is adapted for mounting on a trailer or truck bed chassis, and more specifically to such a rack which is adapted for receiving, storing and transporting pickup truck covers within width limitations.

2. Description of the Related Art

Article racks are used in a wide variety of applications, and are often designed to receive particular types of articles in particular environments. The physical characteristics, i.e., size, shape, weight, etc., of the articles to be stored or transported are often factors in designing a suitable rack. Other factors can include loading and unloading considerations, protection from the elements and space limitations for the rack itself.

Article racks are often associated with vehicles and consequently involve special design considerations to accommodate vehicle movement. For example, the Day U.S. Pat. No. 1,438,813 and the Prickett et al. U.S. Pat. No. 2,839,328 disclose truck bodies with shelves for receiving cases of bottled goods. The shelves slope inwardly and downwardly to retain the cases of goods in place against centrifugal forces which may be encountered when the vehicles turn and maneuver. A trailer vehicle with a similar construction is shown in the Robinson U.S. Pat. No. 2,061,673.

Pickup truck covers are a popular accessory or option for enclosing the beds of pickup trucks on which they are mounted. By thus enclosing the bed with a pickup truck cover, security and protection are provided for tools, materials and various other objects placed in the enclosed pickup truck bed. Pickup truck beds enclosed by covers can also be used as sheltered sleeping quarters.

Pickup truck covers can be fabricated from various materials, including fiberglass, fiber reinforced plastic (FRP), and sheet metal. Pickup truck covers are often manufactured at manufacturing facilities and then transported to dealers for retail sale. Pickup truck cover transport vehicles are sometimes utilized which include racks for receiving the pickup truck covers in orientations which are transverse to the direction of vehicle travel. The covers are generally loaded and unloaded from the vehicle sides, and the racks can be divided into multiple, transversely-extending bays, which each bay being adapted to receive multiple covers in vertically-stacked, cover-receiving spaces. To further increase the number of covers that can be transported in a load, smaller covers can be nested within larger one.

Many previous cover transports are designed for the covers to lay flat and extend transversely from side-to-side. However, relatively long covers oriented in this manner can exceed the load width restrictions applicable on many public roads and highways. Operators of vehicles with over-width loads can be subject to citations and fines by law enforcement officials.

Furthermore, difficulties have been encountered in providing an enclosure for a cover transport, because the enclosure structure further increases the cover transport width, which can result in a vehicle which is illegal to operate on many public roads and highways. However, there are important advantages to enclosing a cover transport. For example, covers transported in enclosed vehicles can be kept cleaner for better appearances when displayed by a dealer, whereby a substantial amount of dealer preparation may be obviated. A transport enclosure can also protect the covers therein from damage from hail, rocks and other falling and flying objects. Degradation of the finish on the covers can also be avoided by shading the covers from direct sunlight. A measure of security and theft protection can be provided by enclosing the cover transports.

The article rack of the present invention addresses these problems with previous cover transports and similar problems that may exist with other article racks.

SUMMARY OF THE INVENTION

In the practice of the present invention, an article rack is provided for mounting on a vehicle chassis. The article rack includes a frame structure forming multiple bays which extend transversely between opposite sides. Each bay includes multiple, vertically-stacked article-receiving spaces, each space being accessible through an opening at one side of the frame structure. A rail assembly includes multiple rail subassemblies, pairs of which are associated with the article-receiving spaces and are adapted for supporting articles therein. The rail assemblies slope upwardly from the frame side openings associated therewith to the opposite side of the frame whereby articles are supported thereon in sloping configurations. A retainer assembly is also associated with each article-receiving space and is mounted on a rail subassembly therein, the retainer assemblies being adapted for retaining an article in the article-receiving space. A frame enclosure is provided for mounting on the frame structure and enclosing the article rack, and includes retractable closures for selectively covering the frame structure side openings. The vehicle chassis can be retrofitted with a longitudinal center beam for reinforcement.

OBJECTS AND ADVANTAGES OF THE PRESENT INVENTION

The objects and advantages of the present invention include: providing an article rack; providing an article rack adapted for mounting on a vehicle chassis; providing an article rack adapted for supporting articles in transversely-sloping positions; providing an article rack which has a width less than the lengths of articles placed therein due to the sloping positions of the articles; providing an article rack which, when mounted on a vehicle chassis, enables relatively long articles placed transversely thereon in sloping positions to be transported legally over certain roads and highways; providing an article rack which is relatively easy to load and unload; providing an article rack which is adapted to be enclosed; providing an article rack which provides a relatively high degree of protection for articles placed thereon; and providing an article rack which is economical to manufacture, efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENTS

I. Introduction and Environment

Figure 1:
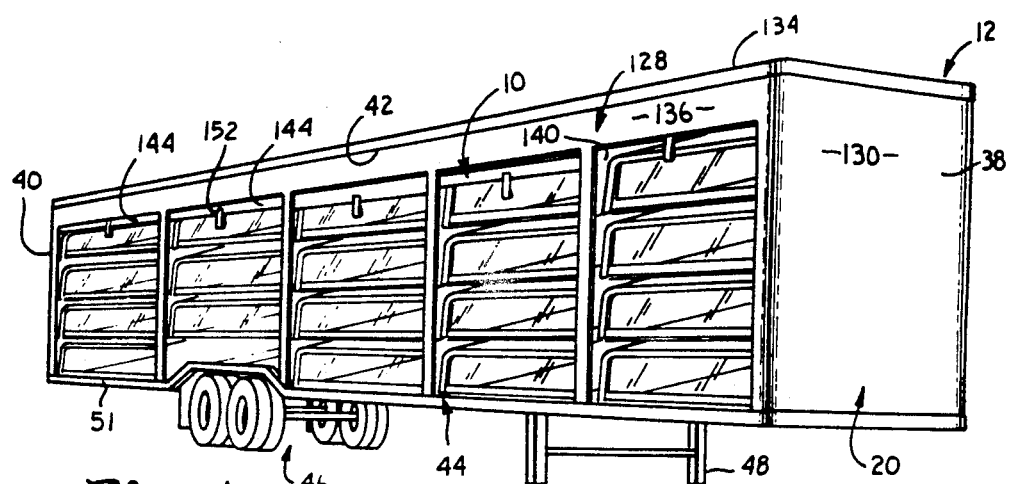
FIG. 1 is a right front perspective view of an article rack embodying the present invention and incorporated in an enclosed trailer.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience and reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the structure being referred to. Said terminology will include the words specifically mentioned, derivatives thereof and words of similar import.

Referring to the drawings in more detail, reference numeral 10 generally designates an article rack embodying the present invention. The article rack 10 is shown mounted in a vehicle 12 comprising a trailer, and generally includes a frame structure 14, a rail system 16, a retainer system 18 and an enclosure system 20.

Figure 6:
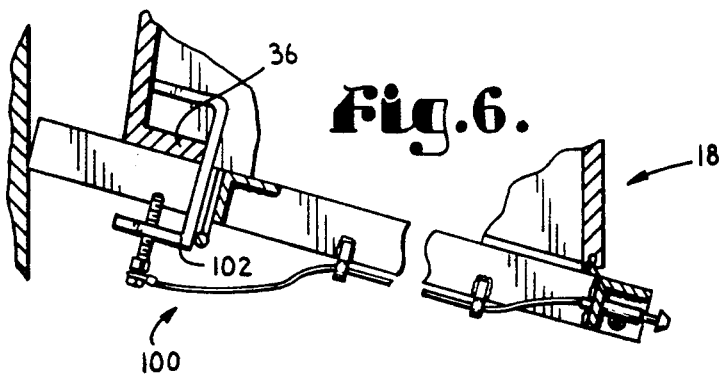
FIG. 6 is an enlarged, fragmentary, cross-sectional view of the article rack and trailer, taken generally along line 6—6 of FIG. 5 and particularly showing a retainer mechanism in its locked position.
Figure 7:
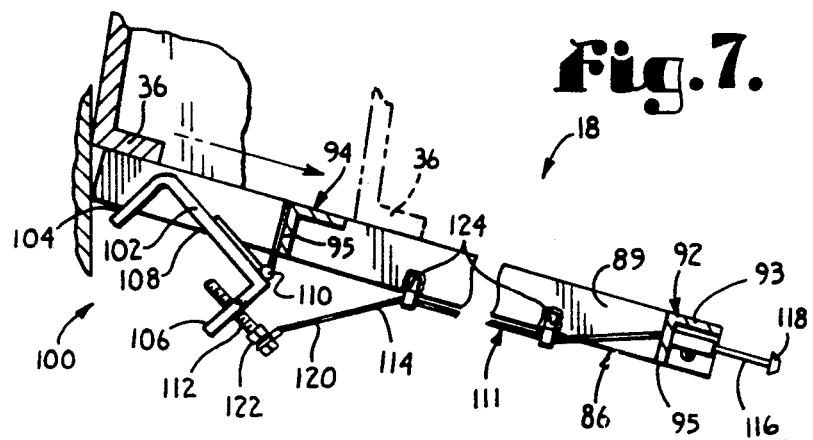
FIG. 7 is an enlarged, fragmentary, vertical, cross-section view of the article rack and trailer, similar to FIG. 6 and particularly showing the retainer mechanism in its released position.

Without limitation on the generality of useful applications for article racks embodying the present invention, the article rack 10 is shown and described as being designed to receive, support and transport pickup trucks covers 22 each including a front end 24, a back end 26, a top 28, a bottom 30 and opposite sides 32. The cover back ends 26 slope downwardly and rearwardly, and include doors 34. The cover front ends 24 include rearwardly-extending lower edge flanges 36 (FIGS. 6 and 7).

II. Trailer 12

Without limitation on the generality of useful installations of the article rack, 10, it is shown mounted on the trailer 12. Alternatively, the rack 10 could be mounted on a truck bed or could be retrofitted in or on a preexisting trailer or truck bed.

Figure 2:
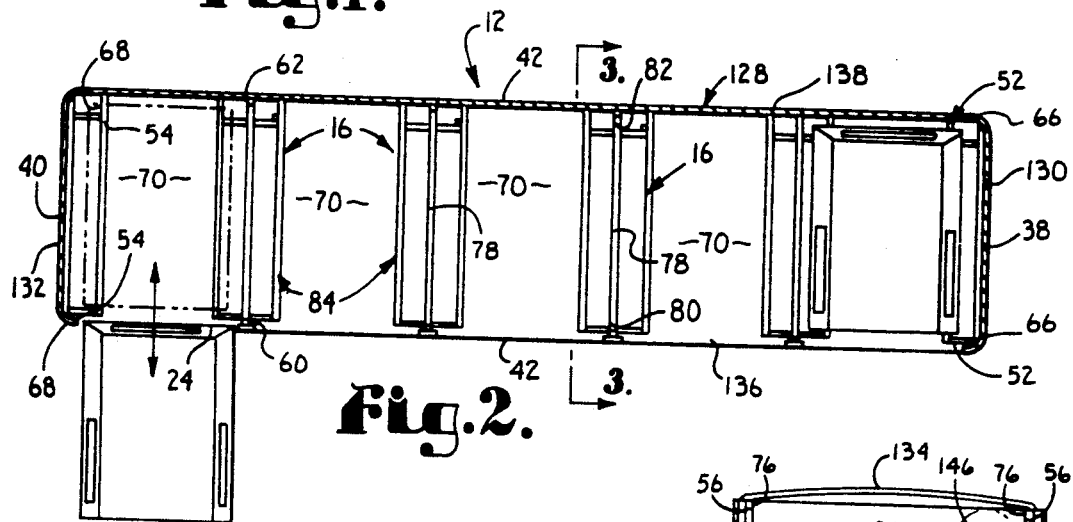
FIG. 2 is a top plan view of the article rack within the trailer, shown with the trailer roof removed.
Figure 4:
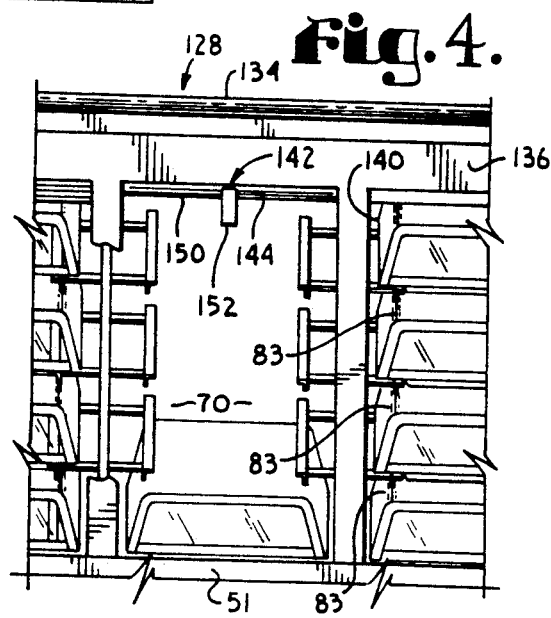
FIG. 4 is an enlarged, fragmentary, right-side elevational view of the trailer.
Figure 3:
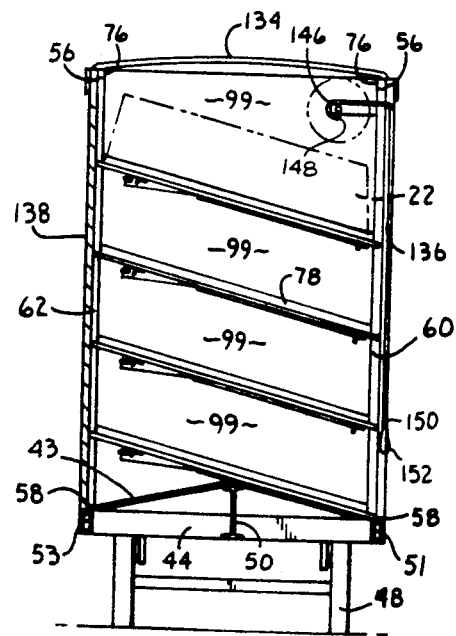
FIG. 3 is an enlarged, vertical, cross-sectional view of the trailer, taken generally along line 3—3 in FIG. 2.
Figure 5:
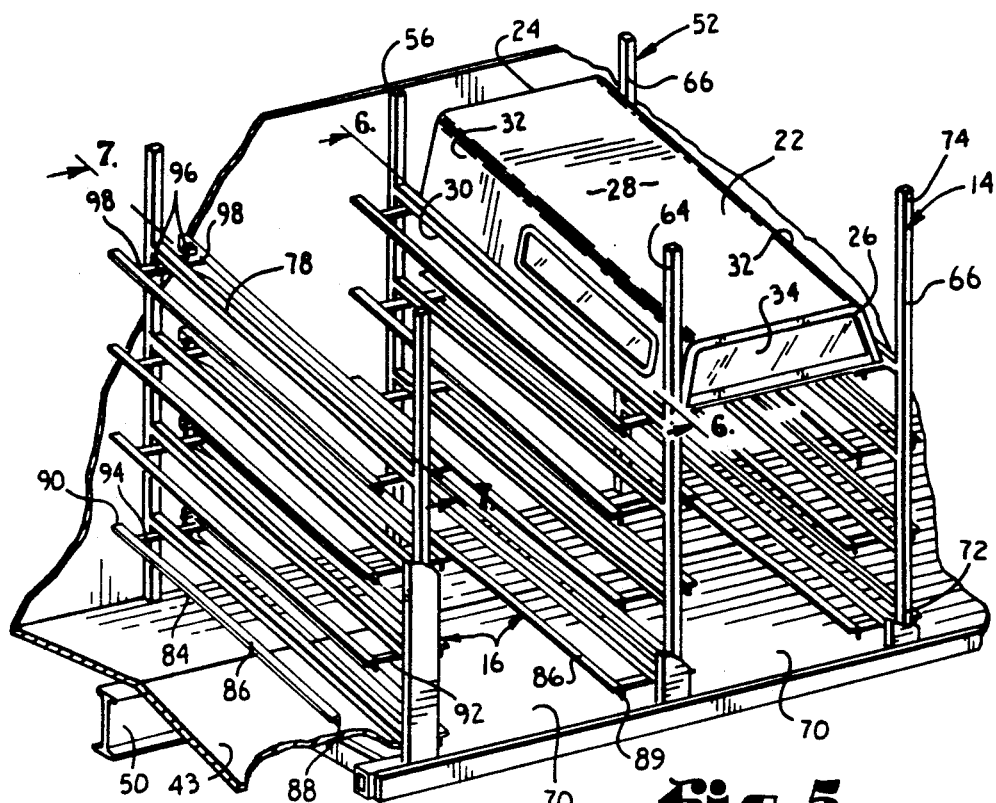
FIG. 5 is an enlarged, fragmentary, top rear right-side perspective view of the article rack and trailer.

As best shown in FIGS. 1-3, the trailer 12 includes a front end 38, a back end 40, opposite sides 42, and a floor 43. A chassis 44 mounts a wheel assembly 46 and a support leg assembly 48. The chassis 44 can include a center beam 50 and first and second rim members or beams 51, 53 extending longitudinally between the trailer front and back ends 38, 40. The center beam 50 can have the configuration of an I-beam (as shown in FIG. 3) or a box beam (not shown) and can be approximately centered between and parallel to the trailer opposite sides 42. Center beam 50 and rim members 51, 53 cooperatively support floor 43, which is pitched downwardly from beam 50 toward rim members 51, 53.

III. Frame Structure 14

The frame structure 14 includes a front end 52, a back end 54, a top 56, a bottom 58 and first and second sides 60, 62. A plurality of vertical columns 64 are arranged in transversely-opposed pairs with each column pair having a column located on each frame structure side 60, 62. A frontmost column pair 66 is positioned at the frame structure front end 52 and a rearmost column pair 68 is positioned at the frame structure back end 54. A plurality (e.g. five are shown) of frame structure bays 70 are formed between the pairs of columns 64, each bay 70 extending transversely between the frame structure opposite sides 60, 62. The column 64 include lower ends 72 connected to the trailer chassis 44 and upper ends 74 interconnected by longitudinally-extending longgitudinal members 76.

The opposed pairs of columns 64 are interconnected by transverse cross members 78 which extend transversely between the frame structure sides 60, 62 and slope downwardly from the second side 62 to the first side 60 at angles of approximately fifteen degrees with respect to horizontal. Each cross member 78 includes a first end 80 connected to a column 64 at the first side 60 and a higher second end 82 connected to a column 64 at the second side 62.

The frame structure 14 can comprise square steel tubing, angle sections, I-beams or any other suitable structural members. Gusset plates, bracing and the like can be provided to stiffen the frame structure 14.

IV. Rail System 16

The rail system 16 includes a plurality of rail subassemblies 84 arranged in longitudinally opposed pairs on the fronts and backs of respective bays 70. Each rail subassembly includes a transverse angle section member 86 with first or lower and second or upper ends 88, 90 located in proximity to the frame structure first and second sides 60, 62. First or lower and second or upper rail mounting members 92, 94 extend longitudinally into the bays 70 from proximate ends 96 connected to respective cross members 78 to distal ends 98 connected to respective rail angle section members 86. The rail mounting members 92, 94 associated with the frontmost and rearmost column pairs 66, 68 extend rearwardly and forwardly only; all of the other rail mounting members 92, 94 are provided in pairs extending both forwardly and rearwardly from respective cross members 78. The paired mounting members 92, 94 can be formed from continuous lengths of material whereby their respective proximate ends 96 are centered on the cross members 78. Thus, except for the cross members 78 extending between the frontmost and rearmost column pairs 66, 68, rail subassemblies 84 are located both in front of and behind respective cross members 78.

The rail members 86 are substantially parallel to the cross members 78, with the cross members 78 generally centered between and extending parallel to respective pairs of rail members 86. The rail angle-section members 86 can comprise steel angle-section with horizontal legs 86 located on top of and projecting into respective bays 70 from vertical legs 89. Each rail mounting member 92, 94 can also comprise steel angle-section, with upper horizontal legs 93 mounted (e.g. welded) on the undersides of respective cross members 78 and vertical legs 95 depending downwardly from the horizontal legs 93. The mounting member distal ends 98 are secured to respective rail members 86, e.g. by welding.

Each bay 70 is subdivided into a plurality of article-receiving spaces 99 (e.g., see FIG. 3, four spaces 99 are shown in each bay 70) by respective, opposed pairs of rail subassemblies 84. Each article-receiving space 99 is thus positioned above a respective opposed pair of rail subassemblies 84 and extends transversely with an upward slope from the frame structure first side 60 to the frame structure second side 62. The frame structure 14 includes a plurality of openings 83 at its first side 60, each opening 83 being associated with a respective bay 70.

V. Retainer System 18

A retainer system 18 for the covers 22 is shown in detail in FIGS. 6 and 7 and can comprise a plurality of retainer mechanisms 100 each associated with a respective article-receiving space 99.

Each retainer mechanism 100 includes a retainer bracket 102 with a channel-shaped cross-sectional configuration including upper and lower flanges 104, 106 interconnected by a web 108. Each bracket 102 is pivotally connected to a respective second or upper rail mounting member 94 by a hinge 110 connected to a respective rail mounting member vertical leg 95 and the retainer bracket web 108. A bolt 112 is threadably received in the lower flange 106 and depends downwardly therefrom. A retainer actuating subassembly 111 is associated with each retainer mechanism 100 and includes a release cable 114 with a first cable end 116 extending through a respective first rail mounting member 92 and connected to a retainer release handle 118 and a second cable end 120 secured by a nut 122 to the bolt 112 at the head end of the bolt 112 below the bracket lower flange 106. The cable 114 slidably passes through cable guides 124 on the vertical leg 89 of the rail member 86.

VI. Enclosure System 20

The enclosure system 20 includes a frame structure enclosure 128 with front, back, top, first side and second side panels 130, 132, 134, 136 and 138 respectively. The enclosure front panel 130 can be forwardly-convex, forwardly converging, forwardly-tapered or otherwise aerodynamically shaped to reduce wind resistance of the article rack 10 in motion. The first side panel 136 includes a plurality (five are shown) of enclosure panel openings 140 which generally align with and correspond to the frame structure openings 83.

Each frame structure opening 83 and enclosure panel opening 140 can be selectively closed by a respective overhead door assembly 142. Each overhead door assembly 142 includes a flexible (e.g. fabric or slatted) door 144 adapted to selectively cover respective openings 83, 140 in a closed position and adapted to be wound on a take-up reel mechanism 146 in a retracted position. Each door 144 includes a proximal end 148 attached to the take-up reel mechanism 146 and a distal end 150 with a handle 152; the distal end 150 can be attached and locked to the vehicle chassis 44 with the door 144 in its closed position.

VII. Operation

Although the article rack 10 of the resent invention has many conceivable uses, an exemplary use is for transporting pickup truck covers 22 on a trailer 12 or other vehicle. The pickup truck covers 22 can be loaded by opening the overhead door assemblies 142 whereby the doors 144 are placed in their retracted positions, which opens the openings 83, 140. Cover front ends 24 can be placed on respective, opposed pairs of rail members 86. By pushing on the cover back ends 26, the covers 22 can be inserted into the trailer 12.

The retainer brackets 102 can be held in their release positions (FIG. 7) during insertion of the covers 22; alternatively, the retainer brackets 102 can be spring-biased to their lock positions and can be pushed over by the front ends 24 of covers 22 being inserted. When the cover front ends 24 pass the retainer brackets 102, the retainer brackets 102 either spring or are actuated (e.g. by the retainer actuating mechanisms 111) to their respective locked positions (FIG. 6) whereupon the retainer bracket upper flanges 104 engage the cover front end lower edge flanges 36 (FIG. 6). The retainer hinges 110 have pivotal axes below the level of the second rail mounting members 94 whereby the retainer bracket webs 108 engage the second rail mounting members 94, which act as stops against further rotation of the retainer brackets 102 from their lock positions until they are actuated by the retainer actuating mechanisms 111.

As an alternative to the retaining mechanisms 100, various other retaining means could be provided for securing the covers 22 in their respective article-receiving spaces 99, including C-clamps for clamping to the rail members 86. As a further alternative to the retainer mechanism 100, various solenoid-actuated, pneumatic, hydraulic or keyed retainer mechanisms could be provided for security and theft protection.

The covers 22 are slid on and supported by the rail members 86. Each article-receiving space 99 is adapted to receive a respective cover 22, although smaller covers can be placed under larger covers for transporting multiple covers in a nested configuration in a single article-receiving space. Covers 22 with configurations as shown (i.e., rearwardly and downwardly sloping back ends 26) are preferably placed in the article-receiving spaces with their front ends 24 inserted first for positioning adjacent to the frame structure second side 62. The downwardly-and-rearwardly sloping cover back ends 26 are thus positioned substantially parallel to and in proximity to the frame structure first side 60 for maximum space utilization. A cover 22 with an overall length greater than the trailer 12 overall width can thus be placed within the enclosure system 20 due to the sloping position of the covers 22. The slope of the rail member 86, which determines the slope of the covers 22, can vary to accommodate particular dimensional requirements of articles to be placed on the article rack 10; fifteen degrees from the horizontal can be advantageously employed for certain covers 22.

With the covers 22 in place, the doors 144 are extended to their closed positions, and their distal ends 150 are attached or locked to the chassis. The trailer 12 is thus secured for transport with the covers 22 comprising its load substantially enclosed and securely retained on the article rack 10.

Upon reaching a destination, the doors 144 are retracted on the take-up reel mechanism 146 and the retainer mechanisms 100 are actuated to place the retainer brackets 102 in their released positions, e.g. by pushing inwardly and upwardly on the covers 22 and pulling the release handles 118 to swing the retainer brackets 102 downwardly (counterclockwise in FIGS. 6 and 7) so that the cover lower edge flanges 36 clear the retainer bracket upper flanges 104 whereby the covers 22 can slide along the rail members 86 and out of the trailer 12.

The sloping position of the loaded covers 22, in addition to minimizing overall trailer width, provides an important advantage in the loading and unloading process, especially for the upper article-receiving spaces 99. The loading operation can be initiated and the unloading operation can be finalized with the cover front ends 24 resting on the rail member first or lower ends and the cover back ends 26 at substantially lower levels. The covers 22 can thus be loaded by sliding them upwardly and can be unloaded by sliding them downwardly, which can be considerably more convenient for workers manually loading and unloading the trailer 12 than article rack systems where the articles, especially relatively long articles such as the covers 22, must be loaded and unloaded horizontally.

It is to be understood that while certain forms of the present invention have been illustrated and described herein, it is not to be limited to the specific forms or arrangement of parts described and shown.

What is claimed and desired to be secured by Letters Patent is as follows:

1. In combination with a vehicle including a chassis mounting wheels, the improvement of an article rack, which includes:
   (a) a frame structure having:
      (1) a top;
      (2) a bottom;
      (3) a front;
      (4) a back;
      (5) a first side;
      (6) a second side;
      (7) a plurality of transversely-spaced pairs of columns including a front column pair and a back column pair, each column being connected to said chassis adjacent to one of said frame structure sides, said column pairs being longitudinally spaced on said chassis whereby a plurality of juxtaposed, transverse bays are formed between adjacent pairs of columns;
      (8) a plurality of cross members extending transversely between said columns of said column pairs, each said column pair having a plurality of parallel, vertically-spaced cross members extending therebetween;
   (b) a plurality of rail subassemblies each including:
      (1) a transverse rail member with a first, lower end positioned in proximity to said frame structure first side and a second, upper end positioned in proximity to said frame structure second side, each said transverse rail member extending in parallel, spaced relation to a respective cross member;
      (2) a first, lower mounting arm having a proximate end connected to a respective cross member and a distal end connected to a respective transverse rail member in proximity to said transverse rail member first, lower end; and
      (3) a second, upper mounting arm having a proximate end connected to a respective frame structure cross member and a distal end connected to a respective transverse rail member in proximity to its second, upper end;
   (c) a plurality of article-receiving spaces stacked vertically in each said bay and each located above a respective pair of rail subassemblies;
   (d) a plurality of retainer assemblies each associated with a respective article-receiving space and including:
      (1) a retainer bracket hingedly mounted on said respective second, upper mounting arm and pivotable between an engaged position projecting upwardly from said mounting arm and a released position;
      (2) handle means mounted on said respective first, lower mounting arm;
      (3) cable means interconnecting said retainer bracket and said handle means; and
      (4) said handle means being movable between engaged and released position whereby said retainer bracket is respectively moved between its engaged and released positions.

2. A vehicle for transporting articles, which comprises:
   (a) a chassis including:
      (1) a front end;
      (2) a back end;
      (3) opposite first and second sides;
      (4) a beam extending longitudinally between said chassis front and back ends and substantially centered between and parallel to said chassis first and second sides; and
      (5) first and second rim members extending longitudinally between said front and back ends along said first and second sides respectively;
   (b) a frame structure mounted on said chassis and including a top, a bottom, a front, a back, a first side, and a second side;
   (c) an opening in said frame structure first side; and
   (d) rail means having a first, lower end located in proximity to said frame structure first side opening and a second, higher end located at proximity to said frame structure second side, said rail means sloping upwardly from its first end to it second end.

3. The invention of claim 2, wherein said frame structure is connected to said beam.

4. The invention of claim 3 wherein said beam comprises an I-beam with upper and lower flanges interconnected by a web extending between said upper and lower I-beam flanges.

5. The invention of claim 2 wherein said rail means includes a pair of rail subassemblies located on opposite sides of said frame structure first side opening with said rail subassembly extending from said rail means first end.

6. The invention of claim 5, wherein each said rail subassembly includes an angle-section rail member extending from said rail means first end to said rail means second end.

7. The invention of claim 2 wherein said frame structure includes a plurality of transversely-extending juxtaposed bays, each having an opening at said frame structure first side.

8. The invention of claim 2 wherein said bay includes a plurality of vertically-stacked article-receiving spaces.

9. The invention of claim 8 which includes a plurality of said rail means each associated with a respective article-receiving space.

10. The invention of claim 2 which includes a retainer means connected to said rail means and adapted for selectively retaining an article on said rail means.

11. The invention of claim 9 wherein said retainer means includes:

(a) a retainer bracket hingedly mounted on said rail means and pivotable between an engaged position projecting upwardly from said rail means and a released position;

(b) handle means mounted on said rail means in proximity to said rail means first, lower end;

(c) cable means interconnecting said retainer bracket and said handle means; and (d) said handle means being movable between engaged and released position whereby said retainer bracket is respectively moved between its engaged and released positions.

12. The invention of claim 2, which includes:

(a) a cover mounted on said frame structure in covering relationship thereover and including a cover opening at said frame structure first side opening.

13. The invention of claim 11, which includes door means adapted to selectively cover said frame structure first side opening and said cover opening.

* * * * *